United States Patent [19]

Maeda et al.

[11] Patent Number: 5,696,200
[45] Date of Patent: Dec. 9, 1997

[54] COLORING COMPOSITION

[75] Inventors: Mutsumi Maeda, Kawasaki; Takeshi Yasui, Yokohama, both of Japan

[73] Assignee: Asahi Kasei Kogyo Kabushiki Kaisha, Osaka, Japan

[21] Appl. No.: 436,212

[22] PCT Filed: Oct. 3, 1994

[86] PCT No.: PCT/JP94/01653

§ 371 Date: May 15, 1995

§ 102(e) Date: May 15, 1995

[87] PCT Pub. No.: WO95/09891

PCT Pub. Date: Apr. 13, 1995

[30] Foreign Application Priority Data

Oct. 3, 1993 [JP] Japan .................. H5-269418

[51] Int. Cl.$^6$ .................................................. C08L 9/00
[52] U.S. Cl. .................................................. 524/575
[58] Field of Search ........................................ 524/575

[56] References Cited

U.S. PATENT DOCUMENTS

| 5,151,324 | 9/1992 | Hanatani et al. | 428/323 |
| 5,536,772 | 7/1996 | Dillman et al. | 524/483 |

FOREIGN PATENT DOCUMENTS

| 0085115 | 8/1982 | European Pat. Off. |
| 0254523 | 7/1987 | European Pat. Off. |
| 0423590 | 4/1991 | European Pat. Off. |
| 3-200841 | 9/1991 | Japan |
| 6-93189 | 4/1994 | Japan |
| 9104299 | 4/1991 | WIPO |

*Primary Examiner*—Edward J. Cain
*Attorney, Agent, or Firm*—Birch, Stewart, Kolasch & Birch

[57] ABSTRACT

Disclosed is a coloring composition comprising (1) a crosslinked block copolymer comprising molecular chains of a base block copolymer comprising at least one polymer block (A) comprised mainly of vinyl aromatic monomer units, and at least one polymer block (B) comprised mainly of conjugated diene monomer units, the molecular chains of the base block copolymer being crosslinked through a crosslinkage containing at least one linkage selected from the group consisting of an imide linkage, an amide linkage, an ester linkage and a urethane linkage; and (2) a colorant, and wherein the coloring composition has a gel content of 60% by weight or more. The coloring composition of the present invention has excellent properties, such as excellent melt adhesion properties with a thermoplastic resin, high thermal stability and high morphological stability. Therefore, by subjecting a thermoplastic resin composition containing the coloring composition of the present invention to molding, various colored shaped thermoplastic resin articles having not only a highly decorative, distinct spot pattern, such as a stone grain pattern, but also excellent mechanical strength, can be obtained. Examples of such shaped resin articles include exterior parts of household electrical appliances and office automation machines, and the main bodies of articles of furniture, lavatory equipment, bathtubs, and musical instruments.

22 Claims, 2 Drawing Sheets

COLORING COMPOSITION

BACKGROUND OF THE INVENTION

1. Field of the Invention

The present invention relates to a coloring composition (i.e., decorating composition). More particularly, the present invention is concerned with a coloring composition comprising (1) a crosslinked block copolymer comprising molecular chains of a base block copolymer comprising at least one polymer block (A) comprised mainly of vinyl aromatic monomer units, and at least one polymer block (B) comprised mainly of conjugated diene monomer units, the molecular chains of the base block copolymer being crosslinked through a crosslinkage containing at least one linkage selected from the group consisting of an imide linkage, an amide linkage, an ester linkage and a urethane linkage; and (2) at least one colorant selected from the group consisting of an organic pigment, an inorganic pigment and an organic dye, and wherein the coloring composition has a gel content of 60% by weight or more. The present invention is also concerned with a colored thermoplastic resin composition comprising a thermoplastic resin and the above coloring composition (decorating composition), and is further concerned with a colored shaped thermoplastic resin article produced from the colored thermoplastic resin composition. The coloring composition of the present invention has excellent properties, such as melt adhesion properties with a thermoplastic resin, thermal stability and morphological stability. Therefore, by subjecting a thermoplastic resin composition containing the coloring composition of the present invention to molding, such as injection molding, various colored shaped thermoplastic resin articles having not only a highly decorative, distinct spot pattern, such as a stone grain pattern, but also excellent mechanical strength, can be obtained. Examples of such shaped resin articles include exterior parts of household electrical appliances and office automation machines, and the main bodies of articles of furniture, lavatory equipment, bathtubs, and musical instruments.

2. Discussion of Related Art

Various techniques have conventionally been proposed for producing a shaped article of a thermoplastic resin having a decorative coloration, such as a spot pattern or a stone grain pattern. As a technique for producing a shaped resin article having a spot pattern, Unexamined Japanese Patent Application Laid-Open Specification No. 49-17831/1974 discloses a method in which mica particles as a decorating agent and a short-fibrous material as a reinforcing agent are dispersed into a thermoplastic resin. As a technique for producing a shaped resin article having a stone grain pattern, Unexamined Japanese Patent Application Laid-Open Specification No. 2-153971/1990 discloses a method in which colored aluminum particles are dispersed in a specific amount into a resin. As a technique for producing a shaped resin article having a wood grain or stone grain pattern, Unexamined Japanese Patent Application Laid-Open Specification No. 55-142613/1980 discloses a method in which a colored, graft-modified polyphenylene ether resin as a decorating agent is incorporated into a resin to be molded, and the resultant colored resin composition is subjected to injection molding at a specific temperature. Unexamined Japanese Patent Application Laid-Open Specification No. 50-105760/1975 discloses a method in which a crosslinked polymer is used as a decorating agent, specifically, a method in which particles of a polymer which has been crosslinked by using divinylbenzene are used as a stone grain patterning agent for stone grain-patterning a polymethyl methacrylate resin (PMMA resin). Unexamined Japanese Patent Application Laid-Open Specification No. 2-103254/1990 discloses a technique for providing a stone grain-patterned resin composition containing a stone grain patterning agent comprised of a particulate epoxy resin which has been cured by using a non-amine curing agent and which contains a dye and pigment. Unexamined Japanese Patent Application Laid-Open Specification No. 3-200841/1991 (corresponding to U.S. Pat. No. 5,151,324) discloses a technique in which a crosslinked polyolefin containing a pigment is used as a coloring material for a synthetic resin. Unexamined Japanese Patent Application Laid-Open Specification No. 3-28148/1991 discloses a technique in which a crosslinked methacrylate resin containing an inorganic filler and a colorant is incorporated into a methyl methacrylate resin as a stone grain patterning agent.

However, the method disclosed in Unexamined Japanese Patent Application Laid-Open Specification No. 55-142613/1980 has problems in that the molding conditions are extremely limited due to the necessity of preventing an undesired deformation of the decorating agent and preventing the migration of dye and pigment from the decorating agent into the surrounding thermoplastic resin matrix. Specifically, according to the technique disclosed in this Japanese patent document, for example, when a high impact polystyrene resin is used as the thermoplastic resin into which the decorating agent is incorporated, an appropriate temperature for injection molding is limited to a narrow range of 180° to 210° C. Further, this temperature range is very low, so that the shaped resin article obtained is poor in surface finish and only poorly reproduces the configuration of the mold cavity. On the other hand, the methods disclosed in Unexamined Japanese Patent Application Laid-Open Specification Nos. 50-105760/1975, 2-103254/1990, and 3-200841/1991 are defective in that the employed stone grain patterning agent is poor in impact strength and tensile elongation, with the result that the thermoplastic resin having the stone grain patterning agent incorporated therein is poor in mechanical properties. Further, the method disclosed in Unexamined Japanese Patent Application Laid-Open Specification No. 3-28148/1991, is also disadvantageous in that because of the use of a radical type initiator as a crosslinking agent, a molecular degradation of the resultant crosslinked resin as the stone grain patterning agent is likely to occur, so that the stone grain-patterned shaped resin article obtained is unsatisfactory in mechanical properties. Thus, the conventional resin-decorating techniques disclosed in the above-mentioned publications have problems either in that the molding conditions are extremely limited or in that the shaped resin article obtained has poor mechanical properties, such as impact strength, tensile elongation, etc., due to an unsatisfactory interfacial adhesion strength between the decorating agent and the resin containing the decorating agent, an unsatisfactory tensile elongation of the resin as the decorating agent, or molecular degradation of the resin as the decorating agent during a crosslinking reaction of the resin. Therefore, these techniques cannot meet the needs of industry.

Further, the techniques disclosed in the above-mentioned unexamined Japanese Patent Application Laid-Open Specification Nos. 49-17831/1974 and 2-153971/1990, i.e., techniques in which mica particles or aluminum particles are used as a decorating agent, have problems in that when injection molding is conducted using a mold having a relatively small gate for injecting a resin therethrough, such as a pin gate mold, it is extremely difficult to obtain a shaped resin article having a decorative spot pattern in which the size of each spot is larger than the diameter of the gate of the mold. Further, even when the decorating agent particles are smaller than the diameter of the gate of the mold, these particles undergo undesirable deformation or breakage due to the shearing force which they suffer at the time of injection of the resin composition through the gate of the mold, so that a shaped resin article in which the decorating agent particles exhibit their original morphology cannot be obtained.

Techniques for improving the physical properties of a thermoplastic resin by adding thereto a thermoplastic elastomer which is well compatible with the thermoplastic resin, have been widely used. However, there is no prior art which employs a colored thermoplastic elastomer as a decorating agent for a thermoplastic resin so as to provide a shaped resin article having a decorative pattern, such as a spot pattern. Conventional thermoplastic elastomers are unsatisfactory in morphological stability at the time of melt processing, so that conventional thermoplastic elastomers are unsuitable for use as a resin decorating agent for patterning a resin with a stone grain pattern or the like.

Further, when conventional thermoplastic elastomers are colored and used as a decorating agent for a resin, problems occur such that, at the time of melt kneading a resin and the decorating agent together, dye or pigment in the decorating agent disadvantageously diffuses from the decorating agent into other components, such as the matrix resin, which are in contact with the decorating agent, so that the color of other components becomes muddled with the color of the dye or pigment.

SUMMARY OF THE INVENTION

Because of the above situations, the present inventors have made extensive and intensive studies with a view toward solving the above-mentioned problems of the prior art. As a result, it has unexpectedly been found that a coloring composition comprising (1) a crosslinked block copolymer comprising molecular chains of a base block copolymer comprising at least one polymer block (A) comprised mainly of vinyl aromatic monomer units, and at least one polymer block (B) comprised mainly of conjugated diene monomer units, the molecular chains of the base block copolymer being crosslinked through a crosslinkage containing at least one linkage selected from the group consisting of an imide linkage, an amide linkage, an ester linkage and a urethane linkage; and (2) a colorant, and wherein the coloring composition has a gel content of 60% by weight or more, is extremely excellent in various properties, such as melt adhesion properties with a thermoplastic resin, thermal stability and morphological stability. It has also been found that when a thermoplastic resin composition containing the above coloring composition is subjected to molding, such as injection molding, the colorant of the coloring composition does not diffuse into other components, such as the matrix resin, which are in contact with the coloring composition, so that, even when ordinary molding conditions are employed, a colored shaped thermoplastic resin article can be obtained which not only has a distinct decorative pattern, but is also excellent in important mechanical properties, such as impact strength. In addition, it has been found that the above coloring composition is excellent in metamorphic susceptivity and recoverability, so that it can be successfully used to produce a shaped resin article which has conventionally been impossible to produce, i.e., a shaped resin article which has a decorative pattern formed of dispersed coloring agent particles in which the size of each coloring agent particle is larger than the diameter of the gate of the mold employed. Based on these novel findings, the present invention has been completed.

It is, accordingly, an object of the present invention to provide a coloring composition which is free from the problems of the prior art, i.e., to provide a coloring composition which has advantages such that the physical properties of a thermoplastic resin to be colored and decorated is not lowered, a wide range of molding conditions can be employed, breakage and permanent deformation of coloring composition particles do not occur during molding, and the degree of freedom is high in the selection of the type of pattern with which a shaped resin article is to be patterned.

It is another object of the present invention to provide a colored thermoplastic resin composition comprising a thermoplastic resin and the above-mentioned coloring composition, which has excellent moldability.

A further object of the present invention is to provide a colored shaped thermoplastic resin article produced from the above-mentioned colored thermoplastic resin composition, which is excellent not only in decorative properties but also in mechanical strength.

The foregoing and other objects, features and advantages will be apparent to those skilled in the art from the following detailed description and claims taken in connection with the accompanying drawings.

DETAILED DESCRIPTION OF THE INVENTION

Figure 1:
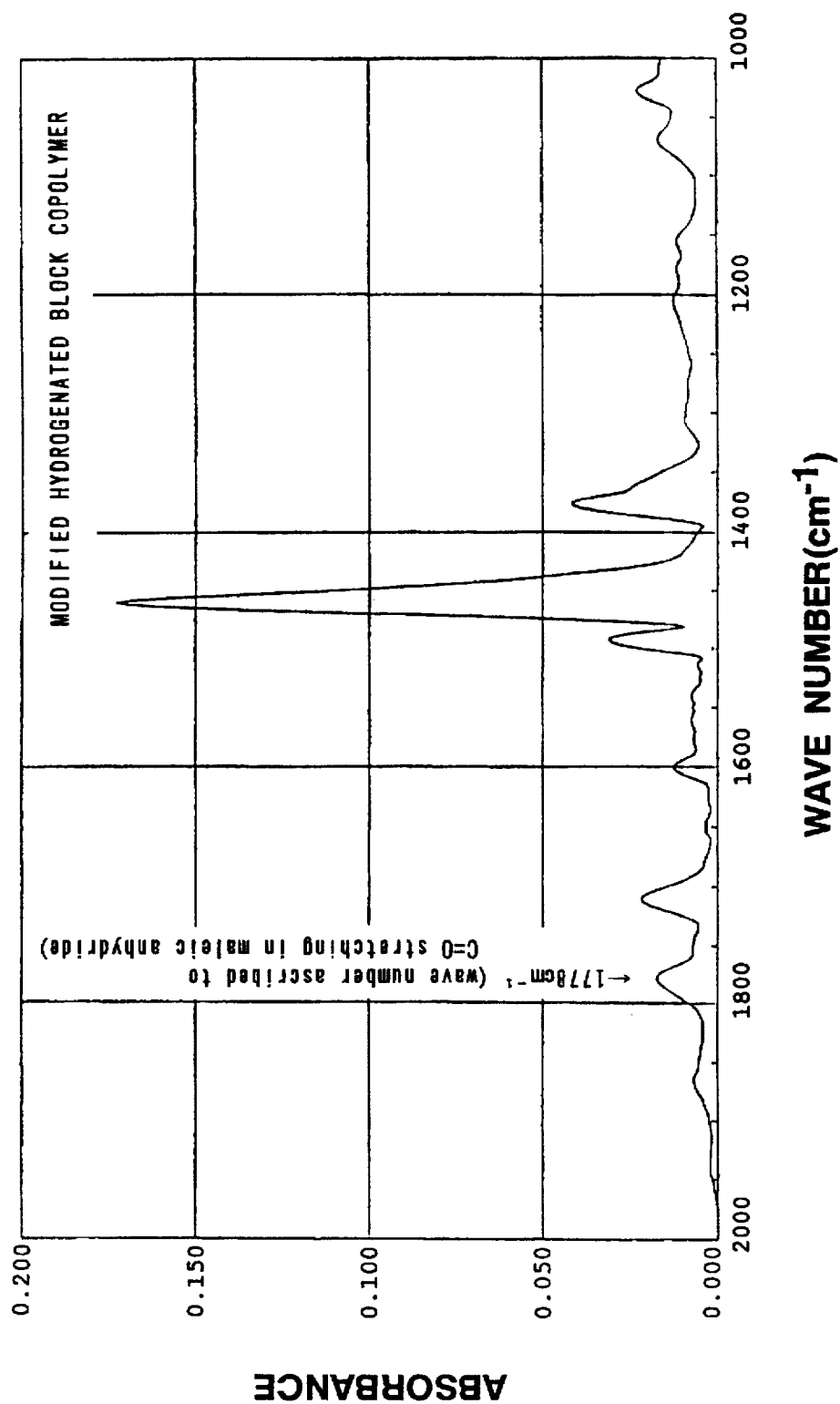
FIG. 1 is a chart showing an infrared absorption spectrum of the modified hydrogenated block copolymer obtained in Referential Example B (B-2)

According to the present invention, there is provided a coloring composition comprising:

(1) 100 parts by weight of a crosslinked block copolymer comprising molecular chains of a base block copolymer comprising at least one polymer block (A) comprised mainly of vinyl aromatic monomer units, and at least one polymer block (B) comprised mainly of conjugated diene monomer units, the molecular chains of the base block copolymer being crosslinked through a crosslinkage containing at least one linkage selected from the group consisting of an imide linkage, an amide linkage, an ester linkage and a urethane linkage; and (2) from 0.001 to 20.0 parts by weight of at least one colorant selected from the group consisting of an organic pigment, an inorganic pigment and an organic dye, the coloring composition having a gel content of 60% by weight or more.

In the coloring composition of the present invention, it is preferred that the polymer block (B) be comprised mainly of hydrogenated, conjugated diene monomer units.

If desired, the coloring composition of the present invention may further comprise a diluent and may have a gel content of from 10 to 80% by weight, preferably from 30 to 60% by weight.

Further, when a colored thermoplastic resin composition comprising a thermoplastic resin and the coloring composition of the present invention, wherein the colored thermoplastic resin composition has a gel content of 0.1 to 50% by weight, is subjected to molding, a colored shaped thermoplastic resin article can be obtained which is decorated with a spot pattern, such as a stone grain pattern. The molding conditions for the colored thermoplastic resin composition (which is another embodiment of the present invention) are not specifically limited, and can be widely varied.

In the colored shaped thermoplastic resin article produced from the colored thermoplastic resin composition of the present invention having a gel content of from 0.1 to 50% by weight, the coloring composition is dispersed in the thermoplastic resin as a plurality of particles having an average particle diameter of from 10 to 30,000 μm. The colored shaped thermoplastic resin article of the present invention exhibits an excellent decorative pattern, such as a distinct stone grain pattern.

The coloring composition and the colored thermoplastic resin composition of the present invention can be advantageously prepared using an extruder.

Hereinafter, the present invention will be described in more detail.

A block copolymer which can be used in preparing the crosslinked block copolymer (1) of the coloring composition of the present invention is a modified block copolymer which comprises molecular chains of an unhydrogenated base block copolymer (hereinafter frequently referred to simply as "unhydrogenated block copolymer") comprising at least one polymer block (A) comprised mainly of vinyl aromatic monomer units, and at least one polymer block (B) comprised mainly of conjugated diene monomer units. Alternatively, the modified block copolymer comprises molecular chains of a hydrogenated base block copolymer (hereinafter frequently referred to simply as "hydrogenated block copolymer") which is obtained by the hydrogenation of the above-mentioned unhydrogenated block copolymer, wherein each of the unhydrogenated base block copolymer and the hydrogenated base block copolymer has at least one functional group introduced thereto. Examples of methods for introducing a functional group to the unhydrogenated base block copolymer or hydrogenated base block copolymer include a method in which a functional group is grafted on the unhydrogenated block copolymer or hydrogenated block copolymer, and a method in which a functional group is copolymerized together with polymer blocks (A) and (B), thereby introducing the functional group to a main chain of the block copolymer. With respect to the type of functional group to be introduced to the unhydrogenated block copolymer or hydrogenated block copolymer, there is no particular limitation. However, it is advantageous to use at least one functional group selected from the group consisting of a hydroxyl group, an epoxy group, an amino group, a carboxylic acid group and a carboxylic acid anhydride group.

In the present invention, as a modified block copolymer, a graft-modified, unhydrogenated block copolymer in which a molecular unit having at least one functional group selected from the group consisting of a carboxylic acid group and a carboxylic acid anhydride group is grafted on an unhydrogenated base block copolymer and/or a graft-modified, hydrogenated block copolymer obtained by grafting the above-mentioned molecular unit on a hydrogenated base block copolymer can be especially advantageously used. Illustratively stated, for example, particularly advantageously employable are a graft-modified, unhydrogenated block copolymer which is prepared by grafting an unsaturated carboxylic acid on an unhydrogenated block copolymer of a vinyl aromatic compound and a conjugated diene compound having a configuration, such as:

A-B,
A-B-A,
A-B-A-B,
A-B-A-B-A,
$(A-B)_4Si$, or
$(A-B-A)_4Si$, wherein A represents a polymer block (A) comprised mainly of vinyl aromatic monomer units and B represents a polymer block (B) comprised mainly of conjugated diene monomer units,
and/or a graft-modified hydrogenated block copolymer which is prepared by grafting an unsaturated carboxylic acid on a hydrogenated block copolymer which is prepared by hydrogenating the conjugated diene moiety of the above block copolymer.

In the present invention, the block copolymer contains from 5 to 60% by weight, preferably from 10 to 55% by weight, of vinyl aromatic monomer units, and from 40 to 95% by weight, preferably from 45 to 90% by weight, of unhydrogenated, conjugated diene monomer units or hydrogenated, conjugated diene monomer units.

Further, polymer block (A) comprised mainly of vinyl aromatic monomer units is a homopolymer block comprised only of vinyl aromatic monomer units, or a copolymer block comprised of vinyl aromatic monomer units and unhydrogenated, conjugated diene monomer units or hydrogenated, conjugated diene monomer units, wherein the vinyl aromatic monomer units are present in an amount of 50% by weight or more, preferably from 70 by weight or more, more preferably 90% by weight or more.

Polymer block (B) comprised mainly of unhydrogenated, conjugated diene monomer units or hydrogenated, conjugated diene monomer units is a homopolymer block comprised only of unhydrogenated, conjugated diene monomer units or hydrogenated, conjugated diene monomer units, or a copolymer block comprised of unhydrogenated, conjugated diene monomer units or hydrogenated, conjugated diene monomer units and vinyl aromatic monomer units, wherein the unhydrogenated, conjugated diene monomer units or hydrogenated, conjugated diene monomer units are present in an amount of 50% by weight or more, preferably 70% by weight or more, more preferably 90% by weight or more.

There is no particular limitation with respect to the distribution of vinyl aromatic monomer units and unhydrogenated, conjugated diene monomer units or hydrogenated, conjugated diene monomer units in each of polymer block (A) comprised mainly of vinyl aromatic monomer units and polymer block (B) comprised mainly of unhydrogenated, conjugated diene monomer units or hydrogenated, conjugated diene monomer units. The distribution of vinyl aromatic monomer units and unhydrogenated, conjugated diene monomer units or hydrogenated, conjugated diene monomer units in each of polymer block (A) and polymer block (B) may be of a random configuration, a tapered configuration (in which the monomer content is continuously increased or decreased along the longitudinal direction of the molecular chain), a block-like configuration, or a combination thereof.

Further, with respect to each of polymer block (A) comprised mainly of vinyl aromatic monomer units and polymer block (B) comprised mainly of unhydrogenated, conjugated diene monomer units or hydrogenated, conjugated diene monomer units, when two or more polymer blocks are present, the individual structures of the polymer blocks may be identical to each other or may be different from each other.

Examples of vinyl aromatic compounds which can provide vinyl aromatic monomer units of the block copolymer include styrene, α-methylstyrene, p-methylstyrene, vinyltoluene, p-tertiary butylstyrene and 1,1'-diphenylethylene. These vinyl aromatic compounds can be used individually or in combination. Of these vinyl aromatic compounds, styrene is preferred.

Examples of conjugated diene compounds which can provide unhydrogenated, conjugated diene monomer units or hydrogenated, conjugated diene monomer units of the block copolymer include butadiene, isoprene, 1,3-pentadiene and 2,3-dimethyl-1,3-butadiene. These conjugated diene compounds can be used individually or in combination. Of these conjugated diene compounds, butadiene, isoprene and a combination thereof are preferred.

The microstructure of the polymer block (B) is not particularly limited. For example, a polybutadiene block may have a 1,2-vinyl linkage content of from 10 to 65%, preferably from 20 to 55%.

In the unhydrogenated block copolymer or hydrogenated block copolymer usable in the present invention, the number average molecular weight is generally in the range of from 5,000 to 1,000,000, preferably from 10,000 to 500,000. Further, from the viewpoint of achieving a good balance of an improvement in the crosslinking efficiency in the production of the coloring composition of the present invention, and an improvement in the mechanical properties and processability of the coloring composition of the present invention, it is especially preferred that the number average molecular weight of the unhydrogenated block copolymer or the hydrogenated block copolymer be in the range from 30,000 to 300,000. With respect to the unhydrogenated block copolymer or hydrogenated block copolymer, it is preferred that the molecular weight distribution [defined as the ratio of the weight average molecular weight (Mw) to the number average molecular weight (Mn), i.e., ratio Mw/Mn] be 10 or less. The weight average molecular weight and the number average molecular weight can be measured using a gel permeation chromatography method, in which a standard polystyrene is used for molecular weight calibration.

The molecules of the unhydrogenated block copolymer or hydrogenated block copolymer may be of a linear, a branched or a radial structure, or a combination thereof.

An example of methods for preparing the above-mentioned hydrogenated block copolymer is described as follows. A block copolymer is synthesized in an inert solvent using a catalyst, such as lithium, in accordance with the method described in Examined Japanese Patent Application Publication No. 40-23798. The obtained block copolymer is subjected to hydrogenation in the presence of a hydrogenation catalyst, thereby obtaining a hydrogenated block copolymer, in accordance with the method described in, for example, Examined Japanese Patent Application Publication No. 42-8704 (corresponding to Australian Patent Application Publication No. 6453173 and Canadian Patent Application Publication No. 815575) or Examined Japanese Patent Application Publication No. 43-6636 (corresponding to U.S. Pat. No. 3,333,024), preferably in accordance with the method described in Examined Japanese Patent Application Publication No. 63-5401 (corresponding to U.S. Pat. No. 4,501,857). With respect to the hydrogenation, it is preferred that at least 80% of the aliphatic double bonds in the conjugated diene monomer units of the block copolymer be hydrogenated. When the hydrogenation degree of the aliphatic double bonds is less than 80%, the shaped resin article obtained is not satisfactory in weather resistance and heat discoloration resistance. The hydrogenation degree of the aliphatic double bonds may be 100%.

With respect to the hydrogenation degree of the aromatic double bonds in the vinyl aromatic monomer units in polymer block (A) and polymer block (B), there is no particular limitation. However, it is preferred Q that the hydrogenation degree of the aromatic double bonds in the vinyl aromatic monomer units in polymer block (A) and polymer block (B) be 20% or less. When the hydrogenation degree of the aromatic double bonds exceeds 20%, the compatibility of the coloring composition with a thermoplastic resin, and the mechanical properties of the block copolymer are lowered.

The content of each of an unhydrogenated aliphatic double bond and an unhydrogenated aromatic double bond in the hydrogenated block copolymer can be measured by customary methods, such as infrared spectroscopy and nuclear magnetic resonance spectroscopy.

An unsaturated carboxylic acid or a derivative thereof, in the form of a solution or in a molten state, is subjected to addition reaction with the above-mentioned unhydrogenated block copolymer or hydrogenated block copolymer in the presence or absence of a radical initiator, to thereby produce a carboxylic acid-grafted, unhydrogenated block copolymer (hereinafter frequently referred to as "modified, unhydrogenated block copolymer") or a carboxylic acid-grafted, hydrogenated block copolymer (hereinafter referred to as "modified, hydrogenated block copolymer"). Any of the unhydrogenated block copolymers and hydrogenated block copolymers which can be used in the present invention can be modified in the above-mentioned manner.

Examples of unsaturated carboxylic acids which can be grafted to the unhydrogenated block copolymer or the hydrogenated block copolymer include maleic acid, a maleic acid halide, itaconic acid, cis-4-cyclohexene-1,2-dicarboxylic acid, endo-cis-bicyclo(2,2,1)-5-heptene-2,3-dicarboxylic acid and anhydrides thereof. Among these examples, maleic acid anhydride is especially advantageous.

With respect to the method for effecting a modification reaction for preparing a modified, unhydrogenated block copolymer or a modified, hydrogenated block copolymer, there is no particular limitation. However, it is not preferred to use a method which gives a modified, unhydrogenated block copolymer or modified, hydrogenated block copolymer containing undesirable matters, such as a gel, or a method which gives a modified, unhydrogenated block copolymer or modified, hydrogenated block copolymer exhibiting a largely increased melt viscosity which would lower the processability of the composition to be produced therefrom. An example of a preferable method for conducting the modification reaction is a method in which the unhydrogenated block copolymer or the hydrogenated block copolymer is reacted with an unsaturated carboxylic acid in the presence of a radical initiator in an extruder.

The amount of unsaturated carboxylic acid which is grafted on the unhydrogenated block copolymer or hydrogenated block copolymer is preferably 20 parts by weight or less, more preferably 10 parts by weight or less, per 100 parts by weight of the unhydrogenated block copolymer or the hydrogenated block copolymer. Even when the amount of unsaturated carboxylic acid grafted on the block copolymer exceeds 20 parts by weight per 100 parts by weight of the block copolymer, almost no further increase in the desired effects of the grafting of the unsaturated carboxylic acid can be obtained over the effects achieved by the use of the unsaturated carboxylic acid in an amount of 20 parts by weight or less. In the present invention, the above-mentioned unsaturated carboxylic acids can be used individually or in combination.

In the present invention, a softener can be added to the modified, unhydrogenated block copolymer and the modified, hydrogenated block copolymer. The softener is one which is generally used as a softener for rubbers and plastics. For example, a petroleum softener, an aliphatic softener or a synthetic organic compound can be used as a softener. Specific examples of softeners include ester plasticizers, such as paraffinic process oil, naphthenic process oil, aromatic process oil, vaseline, paraffin, polyethylene wax, polybutene, linseed oil, soybean oil, epoxidized soybean oil, dioctyl phthalate, a stearic ester and dioctyl adipate. Optionally, a thermoplastic resin or a thermoplastic elastomer can be used as a softener.

The softener is added to the coloring composition of the present invention in order to impart flexibility and flowability to the composition. There is no particular limitation on the amount of the softener to be added, however, the amount of the softener is preferably 200 parts by weight or less per 100 parts by weight of the modified, unhydrogenated block copolymer or modified, hydrogenated block copolymer. When the amount exceeds 200 parts by weight, bleedout of the softener is likely to occur on the surface of a colored shaped thermoplastic resin article to be produced, and the mechanical properties of the colored shaped thermoplastic resin article are also likely to be lowered. When a thermoplastic resin or a thermoplastic elastomer is used as a softener, the amount of the softener is preferably 900 parts by weight or less per 100 parts by weight of the modified, unhydrogenated block copolymer or modified, hydrogenated block copolymer.

To the modified, unhydrogenated block copolymer or modified, hydrogenated block copolymer may be added a compatibility agent for improving the compatibility of the copolymer with a thermoplastic resin to be decoratively patterned. The compatibility agent to be added is one which is generally used for rubbers and plastics. For example, a thermoplastic resin, a thermoplastic elastomer or other high molecular compound can be used as a compatibility agent. The compatibility agent can improve the melt adhesion properties of the coloring composition of the present invention with a thermoplastic resin to be decoratively patterned. There is no particular limitation on the amount of the compatibility agent to be added, however, the amount is preferably 1900 parts by weight or less per 100 parts by weight of the modified, unhydrogenated block copolymer or modified, hydrogenated block copolymer. When the amount exceeds 1900 parts by weight, various problems arise. That is, bleedout is likely to occur on the surface of a colored shaped thermoplastic resin article to be produced, and the inherent excellent properties of the coloring composition, such as impact resistance and tensile elongation, are also likely to be impaired, causing poor mechanical properties of the colored shaped thermoplastic resin article to be produced.

Examples of compatibility agents are mentioned below. When polystyrene, a rubber reinforced polystyrene resin or a modified polyphenylene ether resin is used as a thermoplastic resin to be decoratively patterned, a polystyrene, a copolymer of styrene and a vinyl compound containing a functional group which is not reactive to the modified, unhydrogenated block copolymer or modified, hydrogenated block copolymer, such as a functional group which is appropriately chosen from a carboxylic acid group, a maleic anhydride group, an epoxy group, an amide group and a hydroxyl group depending on the type of modifier used for the modified block copolymer is preferably used as a compatibility agent. For example, when the modified (or modified, hydrogenated) block copolymer contains a carboxylic acid group, a vinyl compound having a carboxylic acid group can be employed. As another example, a copolymer of styrene and an olefin compound may be used as a compatibility agent. When a polyolefin resin, such as polyethylene or polypropylene, or a polyacetal resin is used as a thermoplastic resin to be decoratively patterned, a polyolefin or a copolymer of an olefin and a compound containing the above-mentioned functional group is preferably used as a compatibility agent. When an ABS resin, an AS resin, an acrylic resin or a polycarbonate is used as a thermoplastic resin to be decoratively patterned, a copolymer of styrene and at least one member selected from the group consisting of acrylonitrile, an acrylic acid, an acrylic ester, an olefin and a vinyl compound containing the above-mentioned functional group is preferably used as a compatibility agent. When a polyester is used as a thermoplastic resin to be decoratively patterned, a mixture of a copolymer of styrene and at least one member selected from the group consisting of acrylonitrile, an acrylic acid, an acrylic ester, an olefin and a vinyl compound containing the above-mentioned functional group, with a polycarbonate is preferably used as a compatibility agent. When other types of thermoplastic resins are used as resins to be decoratively patterned, a high molecular weight compound which exhibits compatibility and adhesion properties with the thermoplastic resin is preferably used as a compatibility agent. The above-described compatibility agents for the coloring composition can be used individually or in combination. Other appropriate substances can be used as compatibility agents as long as the substances are capable of improving or retaining the melt-adhesion properties of the block copolymer with a thermoplastic resin.

As a colorant component (2) to be used in the coloring composition of the present invention, at least one colorant selected from the group consisting of an organic pigment, an inorganic pigment and an organic dye is used. The amount of the colorant (2) is 0.001 to 20.0 parts by weight per 100 parts by weight of the modified, unhydroganated block copolymer or modified, hydrogenated block copolymer, each comprising a vinyl aromatic compound and a conjugated diene compound.

Examples of the above-mentioned pigments and dyes include organic pigments, such as a monoazo pigment, a condensed azo pigment, an anthraquinone pigment, an isoindolinone pigment, a heterocyclic pigment, a perinone pigment, a quinacridone pigment, a perylene pigment, a thioindigo pigment, a dioxazine pigment and a phthalocyanine pigment; inorganic pigments, such as titanium oxide, carbon black, Titan Yellow, iron oxide, ultramarine, cobalt blue, a calcined pigment and a special pigment (which include metallic pigments, such as aluminum particles, and mica particles and pearl pigments); and organic dyes, such as an anthraquinone dye, a heterocyclic dye and a perinone dye. The above-mentioned pigments and dyes can be used individually or in combination for coloring the modified, unhydrogenated block copolymer or modified, hydrogenated block copolymer.

The modified, unhydrogenated block copolymer or modified, hydrogenated block copolymer can be colored by a method which has been generally used for coloring a thermoplastic resin or a thermoplastic elastomer. Illustratively stated, preferably 0.1 to 20% by weight of a pigment or dye is blended with 100% by weight of a modified, unhydrogenated block copolymer or a modified, hydrogenated block copolymer to thereby obtain a mixture. The obtained mixture is subjected to melt-kneading by means of an extruder, Brabender Plastograph, a machine for heating and mixing and the like. Thus, a colored, modified unhydrogenated block copolymer or a colored, modified hydrogenated block copolymer is obtained.

For crosslinking the colored, modified unhydrogenated block copolymer or colored, modified hydrogenated block copolymer, for example, when the functional group introduced thereto is a carboxylic acid group or a carboxylic anhydride group, the colored, modified unhydrogenated block copolymer or colored, modified hydrogenated block copolymer is reacted with a crosslinking agent having, per molecule, at least two functional groups which are reactive to the above-mentioned carboxylic acid group or carboxylic anhydride group, or having, per molecule, at least two chemical bonds which exhibit an exchange reaction with the above-mentioned carboxylic acid group or carboxylic anhydride group, to thereby effect a crosslinking reaction.

As a crosslinking agent to be used in the present invention, a compound having at least two functional groups, each independently selected from the group consisting of an amino group, an isocyanate group, a hydroxyl group, an epoxy group, a carboxyl group and a carboxyl anhydride group can be advantageously used. Specific examples of the crosslinking agents include aliphatic diols, such as ethylene glycol, propanediol, 1,3-butanediol, 1,4-butanediol, pentanediol, hexanediol and 2,5-dimethyl-3-hexyne-2,5-diol; aromatic hydroxy compounds, such as bisphenol-A and 2,3,5-trimethylhydroquinone; polyols, such as trimethylolpropanediglycerol, pentaerythritol and resorcinol; aliphatic diamines, such as ethylenediamine, 1,4-diaminobutane and hexamethylenediamine; alicyclicdiamines, such as 1,3-diaminocyclohexane and p,p'-diaminocyclohexylmethane; aromatic diamines, such as o,m,p-phenylenediamine and m-xylylenediamine; polyamines, such as diethyltriamine and hexamethylenetetramine; diisocyanates, such as hexamethylene diisocyanate and diphenylmethane diisocyanate; diglycidyl compounds, such as neopentyl glycol diglycidyl ether and glycerol diglycidyl ether; polyglycidyl compounds, such as trisepoxypropyl isocyanurate and trimethylolpropane triglycidyl ether; alkylethanolamines, such as N,N-diethylethanolamine, aminoethylethanolamine, N-methylethanolamine, N-methyl-N,N'-dibutylethanolamine, and mono-, di- and tri-ethanolamine; and other compounds, such as isopropanolamine, 3-aminopropanol, 2-hydroxyethylaminopropylamine, 2-amino-4-chlorophenol and leuco-1,4-diaminoanthraquinone.

As a high molecular weight compound foruse as a crosslinking agent, which has at least two functional groups, each independently selected from the group consisting of a hydroxyl group, an amino group, an isocyanate group, an epoxy group, a carboxylic acid group and a carboxylic anhydride group, there can be mentioned a monomer having the above-mentioned at least two functional groups; a polymer having the above-mentioned at least two functional groups, which is obtained by radically polymerizing the above-mentioned monomer with a vinyl compound copolymerizable with the monomer; and a polymer having at least two functional groups capable of causing crosslinking reactions, preferably the above-mentioned at least two functional groups, located in the main chain, in the side chain or at the terminal end of the polymer, which polymer is obtained by the polyaddition or the polycondensation of functional compounds. Examples of high molecular weight compounds as crosslinking agents include polyglycols, such as polyethyleneglycol and polybuthyleneglycol; an ethylenevinylalcohol copolymer, which is obtained by the saponification of vinyl acetate units of an ethylene-vinyl acetate copolymer; liquid polybutadiene having a hydroxyl group at each terminal end thereof; an epoxy resin; and ethyleneglycidyl methacrylate copolymer. The above-mentioned high molecular weight compounds can be used individually or in combination.

From the viewpoint of the crosslinking efficiency, the crosslinking agent is preferably a low molecular weight compound. On the other hand, from the viewpoint of safety and preventing hazards to human health during subsequent operations of producing a colored thermoplastic resin composition, a colored shaped thermoplastic resin article and the like, the crosslinking agent is preferably a high molecular weight compound. Therefore, the molecular weight of the crosslinking agent is preferably 40 to 30,000, more preferably 50 to 2,000, still more preferably 100 to 500.

The amount of the crosslinking agent to be used is 0.01 to 50 parts by weight, preferably 0.5 to 20 parts by weight, per 100 parts by weight of the colored, modified unhydrogenated block copolymer or colored, modified hydrogenated block copolymer. The degree of crosslinking of the crosslinked block copolymer component (1) can be controlled by changing the amount of the crosslinking agent.

When the colored, modified unhydrogenated block copolymers or colored, modified hydrogenated block copolymers are crosslinked using the above-mentioned crosslinking agent, the molecular chains thereof are crosslinked through a crosslinkage containing at least one linkage selected from the group consisting of an imide linkage, an amide linkage, an ester linkage and a urethane linkage, to thereby obtain a crosslinked, colored, unhydrogenated block copolymer or a crosslinked, colored, hydrogenated block copolymer in the coloring composition of the present invention.

For promoting the crosslinking of the colored, modified unhydrogenated block copolymer or colored, modified hydrogenated block copolymer, there can be employed a method in which the colored, modified unhydrogenated block copolymer or colored, modified hydrogenated block copolymer is mixed with a crosslinking agent and, then, the resultant mixture is agitated or kneaded at a temperature which is sufficient for the block copolymer to be melted with the crosslinking agent and for a crosslinking reaction to occur.

In the present invention, a crosslinking method employing a melt-kneading machine, such as an extruder or a kneader, can be advantageously used. For avoiding a plug-up of an extruder, which is likely to be caused due to the crosslinking of the block copolymer, it is further advantageous to conduct melt-kneading during the crosslinking reaction in the presence of a diluent, such as a resin, a thermoplastic elastomer or the above-mentioned softener, which does not contain any functional group.

The type of crosslinkage in a crosslinked block copolymer can be qualitatively determined by a spectroscopic method, such as an infrared absorption spectrum or NMR, using as a test sample a crosslinked block copolymer from which a softener component and an extractable component of a compatibility agent have been removed from the crosslinked block copolymer by dissolving them away into a solvent, and, optionally, has further been subjected to swelling to remove pigment or dye therefrom.

Hereinabove, preparation of the coloring composition of the present invention has been described in detail. However, there is no particular limitation with respect to the method for introducing functional groups to the unhydrogenated block copolymer or hydrogenated block copolymer, the method for coloring the modified, unhydrogenated block copolymer or the modified, hydrogenated block copolymer, and the method for crosslinking the colored, modified unhydrogenated block copolymer or the colored, modified hydrogenated block copolymer. Therefore, any methods for preparing a coloring composition can be employed as long as the coloring composition of the present invention can be obtained.

In the present invention, the coloring composition of the present invention has a gel content (%) of 60% by weight or more, preferably 70% by weight or more, still more preferably 80% by weight or more. The upper limit of the gel % in the coloring composition is 100% by weight.

The gel content (%) of 60% by weight or more is advantageous in that the morphological stability and thermal stability of the coloring composition of the present invention are good during injection molding. Further, any pigment or dye, in the decorating agent is substantially not diffused into the matrix resin which is in contact with the coloring composition of the present invention. Therefore, the coloring composition of the present invention exhibits extremely excellent effects as a decorating agent for a thermoplastic resin.

The coloring composition of the present invention is excellent in melt adhesion properties with a thermoplastic resin. Particularly, the coloring composition of the present invention exhibits very excellent melt adhesion properties with a polystyrene, a polyethylene, a polypropylene, a polyamide, a polyester, an acrylic resin, a polyphenylene ether and a polyacetal. Also, the coloring composition of the present invention exhibits a tensile yield elongation as large as more than 100%. Further, the coloring composition of the present invention exhibits excellent melt adhesion properties with a thermoplastic resin, metamorphic susceptivity, metamorphic recoverability and elongation. Therefore, the colored shaped thermoplastic resin article having a decorative pattern, which is produced from the colored thermoplastic resin composition comprising a thermoplastic resin and the coloring composition of the present invention, has markedly improved properties with respect to tensile elongation, impact strength (as evaluated in accordance with the Izod impact test and Du Pont dart drop impact test), as compared to the colored shaped resin articles produced by the conventional resin-decorating techniques.

Further, when the coloring composition of the present invention is used as a decorating agent, because of its excellent metamorphic susceptivity and metamorphic recoverability, a decorative pattern formed of dispersed coloring agent particles having a size larger than the diameter of the pin gate of a mold employed can be easily obtained. Further, it is possible to effectively prevent the coloring agent particles from undergoing undesirable deformation or breakage due to the shearing force which they suffer at the time of the injection of the resin composition through the gate of the mold and, therefore, a shaped thermoplastic resin article in which the decorating agent particles exhibit their original size can be obtained. Thus, the difficult problems accompanying the conventional resin-decorating techniques can be solved.

If desired, for easily coloring a thermoplastic resin, a thermosetting resin and a varnish, the coloring composition of the present invention can be diluted with a diluent, such as a resin, a thermoplastic elastomer, a plasticizer, fats and oils, a surfactant, an adhesive, an organic solvent, an aqueous solution or a lubricant.

The coloring composition of the present invention containing a diluent is especially preferred as a coloring agent for a thermoplastic resin, a thermoplastic elastomer, and a thermosetting resin. In this case, the diluent is preferably a resin, a thermoplastic elastomer, a plasticizer, or fats and oils. Of these, the thermoplastic resin and the thermoplastic elastomer are more preferred.

The thermoplastic resin usable as a diluent is one which is generally used for injection molding. Examples of such thermoplastic resins include a styrene resin, an olefin polymer, such as polyethylene or polypropylene, a modified polyphenylene ether, a polyacetal, a vinyl chloride polymer, a vinyl chloride copolymer, a polycarbonate, a polyamide, a polyester, a polyacrylate, a polyarylate, a polysulfone, a polyethersulfone, a polyetherimide, and a liquid crystalline resin.

Examples of thermoplastic elastomers usable as diluents include a styrene thermoplastic elastomer, an olefin thermoplastic elastomer, an ester thermoplastic elastomer, an amide thermoplastic elastomer, a urethane thermoplastic elastomer, a PVC thermoplastic elastomer, a syndiotactic 1,2-polybutadiene, trans-1,4-polyisoprene, and an ionomer.

The plasticizer usable as a diluent is one which is generally used for imparting fluidity to a thermoplastic resin. Examples of such plasticizers include a phosphoric ester plasticizer, a phthalic ester plasticizer, an aliphatic monobasic acid ester plasticizer (e.g., zinc stearate and sodium stearate), a dihydric alcohol plasticizer, a hydroxycarboxylic ester plasticizer, a chlorinated paraffin, and a dinonyl naphthalene.

Examples of thermosetting resins usable as diluents include an epoxy resin, a xylene resin, a guanamine resin, a diallylphthalate resin, a vinylester resin, a phenol resin, an unsaturated polyester, a furan resin, a polyimide, poly-p-hydroxybenzoic acid, a polyurethane, a maleic acid resin, a melamine resin, and an urea resin.

Examples of fats and oils usable as diluents include soybean oil, coconut oil, linseed oil, castor oil, whale oil, hardened oil, a fatty acid or an ester thereof, a higher alcohol, and a glycerol compound.

Especially, when a styrene resin or a styrene thermoplastic elastomer is used as a diluent, the coloring composition of the present invention exhibits very excellent properties.

The above-mentioned diluents can be used individually or in combination. Also, other types of diluents can be used as long as the coloring composition of the present invention can be obtained.

Further, the coloring composition of the present invention may be a mixture of at least two types of coloring compositions which are produced separately.

For preparing the coloring composition containing a diluent, there can be employed a method in which the diluent is added to the coloring composition of the present invention and, then, the resultant coloring composition is melt-kneaded by means of an extruder, Brabender Plastograph, or a kneader. In the present invention, a method in which the coloring composition containing a diluent is melt-kneaded by means of an extruder can be most advantageously used.

The gel content of the coloring composition containing a diluent is preferably from 10 to 80% by weight. In this case, the morphological stability and thermal stability of a decorative pattern, such as a stone pattern, which is formed by the coloring composition of the present invention, can be improved, so that the dispersion of a pigment or dye from the decorating agent into the surrounding thermoplastic resin can be prevented. A colored shaped thermoplastic resin article having a satisfactory decorative pattern can be easily obtained by adding the coloring composition of the present invention to a thermoplastic resin, and molding the resultant colored thermoplastic resin composition. The gel content of the coloring composition containing a diluent is more preferably from 15 to 50% by weight. In such a case, a colored shaped thermoplastic resin article with a more satisfactory decorative pattern can be obtained.

The thermoplastic resin contained in the colored thermoplastic resin composition of the present invention is one which is generally used for injection molding. Examples of such thermoplastic resins include a styrene resin, an olefin polymer, such as polyethylene or polypropylene, a modified polyphenylene ether, a polyacetal, a vinyl chloride polymer, a vinyl chloride copolymer, a polycarbonate, a polyamide, a polyester, a polyacrylate, a polyarylate, a polysulfone, a polyethersulfone, a polyetherimide, and a liquid crystalline resin. Of these, a styrene resin is most preferred.

Examples of such styrene resins include polystyrene, an AS (acrylonitrile-styrene) resin, and a resin in which a rubber phase is dispersed in the form of island-like particles in a matrix resin phase, for example, a rubber-reinforced polystyrene, an ABS (acrylonitrile-butadiene-styrene) resin, an ASA (acrylate-styrene-acrylonitrile) resin, and an MBS (methyl methacrylate-butadiene-styrene) resin. The rubber-reinforced polystyrene is a resin in which a rubber phase, such as a polybutadiene or a styrene-butadiene rubber (SBR), is dispersed in the form of island-like particles in a matrix resin phase comprising a polymer comprised mainly of a styrene. The ABS resin is a resin in which a rubber phase, such as a polybutadiene or an SBR, is dispersed in the form of island-like particles in a matrix resin phase comprising a copolymer comprised mainly of styrene and acrylonitrile. The ASA resin is a resin in which an acrylate rubber phase is dispersed in the form of island-like particles in a matrix resin phase comprising a copolymer comprised mainly of styrene and acrylonitrile. The MBS resin is a resin in which a butadiene rubber phase is dispersed in the form of island-like particles in a matrix resin phase comprising a copolymer comprised mainly of styrene and methyl methacrylate.

The above-mentioned thermoplastic resins can be used individually or in combination.

For producing the colored thermoplastic resin composition of the present invention, a method in which at least one type of the coloring composition of the present invention is mixed with a thermoplastic resin as mentioned above, can be employed. More specifically, at least one type of the coloring composition of the present invention is mixed with a thermoplastic resin as mentioned above, and the resultant mixture is melt-kneaded by means of an extruder, Brabender Plastograph, or a kneader. Of these, use of an extruder is most preferred.

When the gel content of the colored thermoplastic resin composition of the present invention is from 0.1 to 50% by weight, a colored shaped thermoplastic resin article having a distinct and stable decorative pattern can be obtained. Further, when the gel content of the colored thermoplastic resin composition of the present invention is from 0.5 to 30% by weight, a colored shaped resin article having a more preferable decorative pattern can be obtained.

The colored thermoplastic resin composition of the present invention can be directly subjected to injection molding by means of an ordinary injection machine for plastics. Even when a mixture of the coloring composition of the present invention and a conventional resin composition is subjected to injection molding, a colored shaped resin article having a satisfactory decorative pattern, such as an exterior part, can be obtained. The molding method for producing a colored shaped thermoplastic resin article of the present invention is not limited to the injection molding method, and any known method including a compression molding method and a blow molding method can be used.

In the colored shaped thermoplastic resin article of the present invention produced from the colored thermoplastic resin composition having a gel content of from 0.1 to 50% by weight, the coloring composition is dispersed in the thermoplastic resin as a plurality of particles having an average particle diameter of from 10 to 30,000 μm. The colored shaped thermoplastic resin article of the present invention has an excellent decorative pattern, such as a distinct stone grain pattern, which is extremely stable, and the contour of which is substantially not muddled by the dispersion of a dye or pigment. Especially when the colored thermoplastic resin composition having a gel content of from 0.5 to 30% by weight is employed for producing a colored shaped thermoplastic resin article, the colored shaped thermoplastic resin article produced exhibits a more preferable decorative pattern.

There is no limitation on the use of the colored shaped thermoplastic resin articles of the present invention. For example, the colored shaped thermoplastic resin articles of the present invention can be advantageously used for exterior and interior parts of electrical equipment, electronic equipment, office automation machines, audio systems, cars, toys, furniture, washstands, bathtubs, toilet seats, and musical instruments.

Especially, the colored shaped thermoplastic resin articles of the present invention can be more advantageously used for exterior parts of air conditioners, vacuum cleaners, television sets, computers, CRT, facsimile machines, copying machines, refrigerators, laundry machines and washstands and hangers, planters, tableware, musical instruments, toilet seats, and furniture.

Further, known additives can be added to the coloring composition and colored thermoplastic resin composition of the present invention. Examples of such additives include antioxidants, ultraviolet absorbers, antistatic agents, lubricants, plasticizers, flame-retardants, mold release agents, and reinforcements, such as glass fibers and asbestos, and fillers, such as calcium carbonate, talc, calcium sulfate and woodmeal.

BEST MODE FOR CARRYING OUT THE INVENTION

The present invention will be described in greater detail with reference to the following Examples, which should not be construed as limiting the scope of the present invention.

In the following Examples, physical properties and other characteristics are measured as follows.

(1) Gel content (gel %): The weight of a composition, such as a coloring composition, a colored thermoplastic resin composition or a colored shaped thermoplastic resin article, is measured. Next, the composition is subjected to extraction of soluble matters for 24 hours by a Soxhlet extraction method. With respect to the solvent to be used in the extraction, a solvent for the diluent and the thermoplastic resin contained in the composition is used as the solvent. For example, when the thermoplastic resin is a styrene polymer, an acrylic resin, or a modified polyphenylene ether, xylene is used as the solvent; when the thermoplastic resin is an olefin polymer or a polyacetal, trichlorobenzene is used as the solvent; and when the thermoplastic resin is a polyamide, hexafluoroisopropanol is used as the solvent. After the extraction, any residual matter obtained is washed with acetone, and subjected to vacuum drying at 140° C. to obtain a dry matter. The weight of the dry matter is measured and taken as the "dry weight after extraction". The gel content (%) is determined by the following formula.

$$\text{Gel content (gel \%)} = \frac{\text{Dry weight after extraction }(g)}{\text{Weight of composition }(g)} \times 100.$$

(2) Examination of spot pattern: With respect to a colored shaped resin article (a flat plate-shape article having a size of 90 mm×50 mm×3 mm), the distinctness of the contour of spots of a spot pattern on the shaped resin article is evaluated by visual observation, and the average diameter of the spots (average particle diameter obtained on the assumption that the spots are circular) is measured, using an image processing apparatus (IP-1000 manufactured and sold by Asahi Chemical Industry Co., Ltd., Japan).

(3) Dart drop impact strength: Dart drop impact strength is measured in accordance with the Du Pont dart drop impact test, as follows. The above-mentioned flat shaped resin article is placed on a table having a hemispherical recess of a diameter of 15.2 mm so that one surface of the shaped resin article covers the recess of the table. A steel dart having a weight of 1 kg and in which a forward end (to be brought into collision with the shaped resin article) is rounded to have a hemispherical shape having a diameter of ½ inch (12.7 mm), is lifted above the shaped resin article to a height of H cm (distance between the forward end of the dart and an upper surface of the shaped resin article) and allowed to fall and collide with a portion of the shaped resin article which corresponds to the recess of the table. The impact strength [H (kg·cm)] required for causing a cracking in the shaped resin article with a probability of 50% is determined and taken as the dart impact strength.

Referential Example A [Production of hydrogenated block copolymers]

(A-1): A styrene-butadiene copolymer elastomer is provided which has a configuration of polybutadiene-polystyrene-polybutadiene-polystyrene and has a styrene content of 35%, a number average molecular weight of 166,000, a molecular weight distribution of 1.04, and a 1,2-vinyl linkage content of the polybutadiene block of 37%. This copolymer elastomer is hydrogenated at a polybutadiene moiety thereof according to the method disclosed in Examined Japanese Patent Application Publication No. 63-4841 (corresponding to U.S. Pat. No. 4,501,857), thereby obtaining a hydrogenated styrene-butadiene copolymer elastomer in which the polybutadiene moiety has a hydrogenation degree of 99%.

(A-2): Substantially the same procedure as in (A-1) is repeated except that use is made of a styrene-butadiene copolymer elastomer which has a configuration of polybutadiene-polystyrene-polybutadiene-polystyrene and has a styrene content of 22%, a number average molecular weight of 64,000, a molecular weight distribution of 1.03, and a 1,2-vinyl linkage content of the polybutadiene block of 55%, thereby obtaining a hydrogenated styrene-butadiene copolymer elastomer in which the polybutadiene moiety has a hydrogenation degree of 98%.

Referential Example B [Production of modified (or modified, hydrogenated) block copolymers]

(B-1): 100 parts by weight of the hydrogenated block copolymer obtained in (A-1) are mixed with 2.0 parts by weight of maleic anhydride and 0.2 part by weight of 2,5-dimethyl-2,5-di(tertiary butylperoxy)hexane, and the resultant mixture is melt-kneaded at 250° C. by means of a twin-screw extruder having a screw diameter of 30 mmφ, to effect an addition modification reaction, thereby obtaining a modified hydrogenated block copolymer. In the obtained modified hydrogenated block copolymer, maleic anhydride is grafted in an amount of 1.5 parts by weight per 100 parts by weight of the polymer.

(B-2): 100 parts by weight of the hydrogenated block copolymer obtained in (A-2) are mixed with 2.5 parts by weight of maleic anhydride and 0.25 part by weight of dicumyl peroxide, and the resultant mixture is melt-kneaded at 250° C. by means of a 30 mmφ twin-screw extruder, to effect an addition modification reaction, thereby obtaining a modified hydrogenated block copolymer. In the obtained modified hydrogenated block copolymer, maleic anhydride is grafted in an amount of 1.8 parts by weight per 100 parts by weight of the polymer.

(B-3): 100 parts by weight of the block copolymer having a configuration of polybutadiene-polystyrene-polybutadiene-polystyrene employed as the starting material in (A-1) are mixed with 2.0 parts by weight of maleic anhydride and 0.2 part by weight of 2,5-dimethyl-2,5-di(tertiary butylperoxy)hexane, and the resultant mixture is melt-kneaded at 250° C. by means of a 30 mmφ twin-screw extruder, to effect an addition modification reaction, thereby obtaining a modified block copolymer. In the obtained modified block copolymer, maleic anhydride is grafted in an amount of 1.7 parts by weight per 100 parts by weight of the polymer.

Referential Example C [Production of colored modified (or modified, hydrogenated) block copolymers]

(C-1): 100 parts by weight of the modified, hydrogenated block copolymer obtained in (B-1) are mixed with 1.0 part by weight of a carbon black powder, and the resultant mixture is melt-kneaded at 220° C. by means of a 30 mmφ twin-screw extruder, thereby obtaining a colored, modified hydrogenated block copolymer having a black color.

(C-2): 100 parts by weight of the modified, hydrogenated block copolymer obtained in (B-2) are mixed with 0.3 part by weight of perylene red dye (IRGAZIN Red BPT manufactured and sold by CIBA-GEIGY, Switzerland), and the resultant mixture is melt-kneaded at 220° C. by means of a 30 mmφ twin-screw extruder, thereby obtaining a colored, modified hydrogenated block copolymer having a bright red color.

(C-3): 100 parts by weight of the modified, hydrogenated block copolymer obtained in (B-1) are mixed with 0.2 part by weight of anthraquinone yellow pigment (CROMOPHTAL Yellow AGR manufactured and sold by CIBA-GEIGY, Switzerland), and the resultant mixture is melt-kneaded at 220° C. by means of a 30 mmφ twin-screw extruder, thereby obtaining a colored, modified hydrogenated block copolymer having a bright yellow color.

(C-4): 100 parts by weight of the modified, hydrogenated block copolymer obtained in (B-1) are mixed with 2.0 parts by weight of titanium oxide white pigment (TIOXIDE R-TC30 PW 6 manufactured and sold by ICI, Great Britain), and the resultant mixture is melt-kneaded at 220° C. by means of a 30 mmφ twin-screw extruder, thereby obtaining a colored, modified hydrogenated block copolymer having a white color.

(C-5): 100 parts by weight of the modified block copolymer obtained in (B-3) are mixed with 5.0 parts by weight of aluminum particle pigment (Super Mirror SP-10, 310 manufactured and sold by DAIYA Kogyo Co., ltd., Japan), and the resultant mixture is melt-kneaded at 220° C. by means of a 30 mmφ twin-screw extruder, thereby obtaining a colored, modified block copolymer having a gray color.

(C-6): 100 parts by weight of the modified block copolymer obtained in (B-1) are mixed with 100 parts by weight of a styrene-maleic anhydride copolymer (styrene/maleic anhydride weight ratio 92/8) and 2.0 parts by weight of a carbon black powder, and the resultant mixture is melt-kneaded at 230° C. by means of a 30 mmφ twin-screw extruder, thereby obtaining a colored, modified block copolymer having a black color.

(C-7): 100 parts by weight of the modified block copolymer obtained in (B-1) are mixed with 1500 parts by weight of a styrene-maleic anhydride copolymer (styrene/maleic anhydride weight ratio 92/8) and 16.0 parts by weight of a carbon black powder, and the resultant mixture is melt-kneaded at 230° C. by means of a 30 mmφ twin-screw extruder, thereby obtaining a colored, modified block copolymer having a black color.

(C-8): 100 parts by weight of the modified block copolymer obtained in (B-1) are mixed with 2500 parts by weight of a styrene-maleic anhydride copolymer (styrene/maleic anhydride weight ratio 92/8) and 26.0 parts by weight of a carbon black powder, and the resultant mixture is melt-kneaded at 240° C. by means of a 30 mmφ twin-screw extruder, thereby obtaining a colored, modified block copolymer having a black color.

(C-9): 100 parts by weight of the modified block copolymer obtained in (B-1) are mixed with 100 parts by weight of a styrene-acrylic acid-maleic anhydride copolymer (Delpet 980N manufactured and sold by Asahi Chemical Industry Co., Ltd., Japan) and 2.0 parts by weight of a carbon black powder, and the resultant mixture is melt-kneaded at 230° C. by means of a 30 mmφ twin-screw extruder, thereby obtaining a colored, modified block copolymer having a black color.

(C-10): 100 parts by weight of the modified block copolymer obtained in (B-1) are mixed with 2400 parts by weight of a styrene-acrylic acid-maleic anhydride copolymer (Delpet 980N manufactured and sold by Asahi Chemical Industry Co., Ltd., Japan) and 25.0 parts by weight of a carbon black powder, and the resultant mixture is melt-kneaded at 230° C. by means of a 30 mmφ twin-screw extruder, thereby obtaining a colored, modified block copolymer having a black color.

Referential Example D [Crosslinking of modified, hydrogenated block copolymer]

(D-1): 100 parts by weight of the modified, hydrogenated block copolymer obtained in (B-2) are mixed with 3.0 parts by weight of a crosslinking agent (polyethyleneglycoldiamine: Jeffamine EDR-148 manufactured and sold by Texaco Chemical Company, U.S.A.) and 20 parts by weight of a paraffin oil (Dianaprocess oil PW-380, manufactured and sold by Idemitsu Kosan Co., Ltd., Japan). The resultant mixture is melt-kneaded at 220° C. by using a Brabender Plastograph, to thereby obtain a crosslinked, hydrogenated block copolymer which is a crosslinked product of the modified, hydrogenated block copolymer of (B-2).

The obtained crosslinked, hydrogenated block copolymer is placed in xylene and shaken for 6 hours to extract soluble matters. Infrared absorption spectroscopy is conducted for identification of residual matter.

Figure 2:
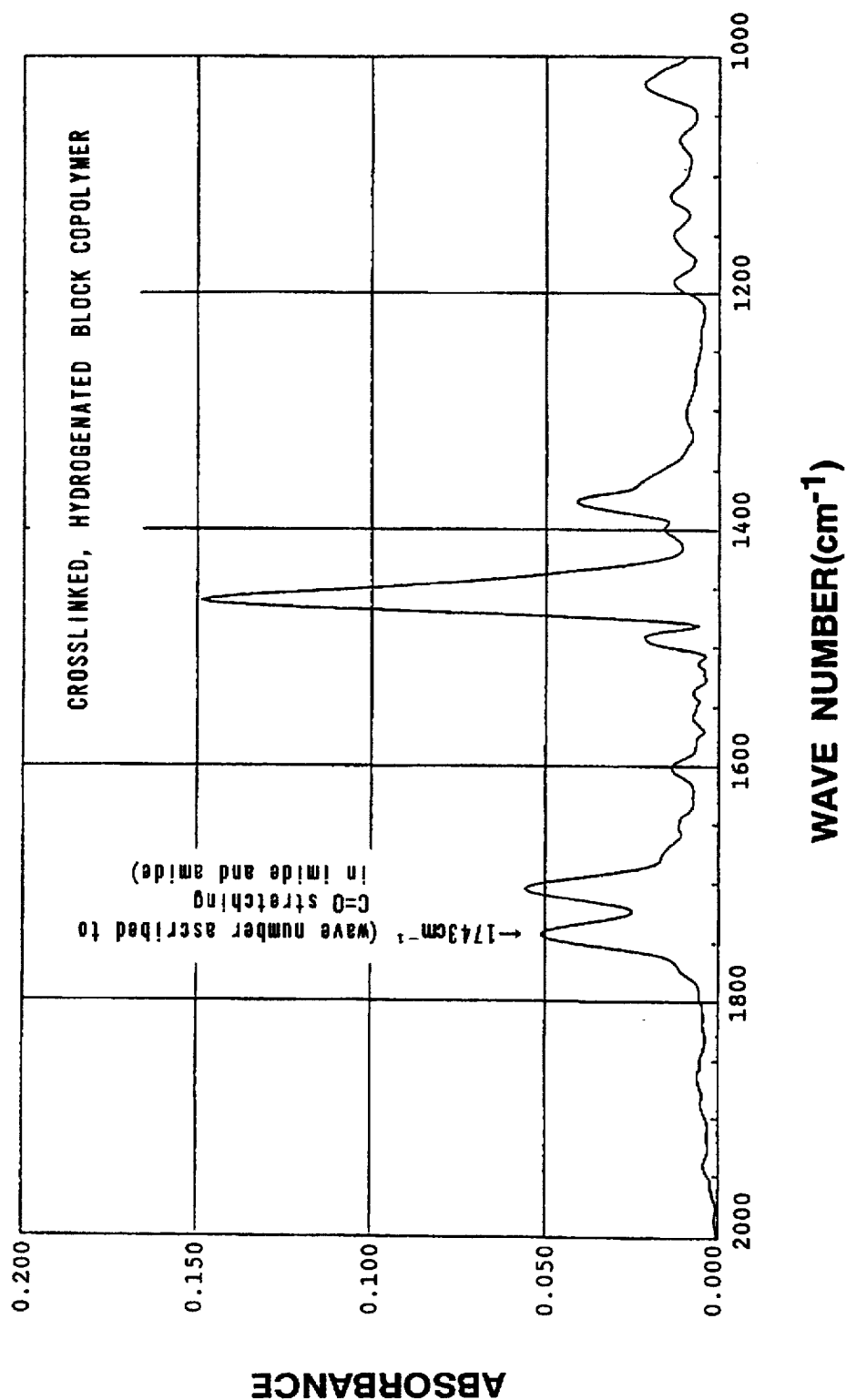
FIG. 2 is a chart showing an infrared absorption spectrum of the crosslinked hydrogenated block copolymer obtained in Referential Example D by crosslinking the modified hydrogenated block copolymer of Referential Example B (B-2).

FIG. 1 is a chart showing an infrared absorption spectrum of the modified, hydrogenated block copolymer, and FIG. 2 is a chart showing an infrared absorption spectrum of the crosslinked, hydrogenated block copolymer. In FIG. 1, there can be observed an absorption band at a wave number of 1778 cm$^{-1}$ ascribed to C=O stretching in maleic anhydride which is grafted on the block copolymer. In FIG. 2, there can be observed an absorption band at a wave number of 1743 cm$^{-1}$ ascribed to C=O stretching in the crosslinkages (imide linkage and amide linkage).

Referential Example E [Production of coloring composition]

(E-1): 100 parts by weight of the colored, modified, hydrogenated block copolymer obtained in (C-1) are mixed with 3.0 parts by weight of 1,4-butanediol and 5 parts by weight of a polystyrene (Asahi Chemical Polystyrene 403R, manufactured and sold by Asahi Chemical Industry Co., Ltd., Japan). The resultant mixture is melt-kneaded for 10 minutes at 230° C. by means of a Brabender Plastograph, to thereby obtain a coloring composition.

(E-2): 100 parts by weight of the colored, modified hydrogenated block copolymer obtained in (C-2) are mixed with 3.0 parts by weight of 1,4-butanediol and 5 parts by weight of a high density polyethylene (Suntec-HD-J311, manufactured and sold by Asahi Chemical Industry Co., Ltd., Japan). The resultant mixture is melt-kneaded for 10 minutes at 230° C. by means of a Brabender Plastograph, to thereby obtain a coloring composition.

(E-3): 100 parts by weight of the colored, modified hydrogenated block copolymer obtained in (C-3) are mixed with 3.0 parts by weight of 1,4-butanediol and 5 parts by weight of a low density polyethylene (Suntec-LD-M6525, manufactured and sold by Asahi Chemical Industry Co., Ltd., Japan). The resultant mixture is melt-kneaded for 10 minutes at 230° C. by means of a Brabender Plastograph, to thereby obtain a coloring composition.

(E-4): 100 parts by weight of the colored, modified hydrogenated block copolymer obtained in (C-4) are mixed with 3.0 parts by weight of 1,4-butanediol and 5 parts by weight of polypropylene (Asahi Chemical Polypropylene M7546, manufactured and sold by Asahi Chemical Industry Co., Ltd., Japan). The resultant mixture is melt-kneaded for 10 minutes at 230° C. by means of a Brabender Plastograph, to thereby obtain a coloring composition.

(E-5): 100 parts by weight of the colored, modified hydrogenated block copolymer obtained in (C-5) are mixed with 3.0 parts by weight of 1,4-butanediol and 5 parts by weight of an acrylic resin (Delpet 560F, manufactured and sold by Asahi Chemical Industry Co., Ltd., Japan). The resultant mixture is melt-kneaded for 10 minutes at 230° C. by means of a Brabender Plastograph, to thereby obtain a coloring composition.

(E-6): 100 parts by weight of the colored, modified hydrogenated block copolymer obtained in (C-1) are mixed with 3.0 parts by weight of 1,4-butanediol and 5 parts by weight of an ABS resin (Stylac-ABS-121B, manufactured and sold by Asahi Chemical Industry Co., Ltd., Japan). The resultant mixture is melt-kneaded for 10 minutes at 250° C. by means of a Brabender Plastograph, to thereby obtain a coloring composition.

(E-7): 100 parts by weight of the colored, modified hydrogenated block copolymer obtained in (C-1) are mixed with 3.0 parts by weight of 1,4-butanediol and 5 parts by weight of a polyacetal (Tenac-C4510, manufactured and sold by Asahi Chemical Industry Co., Ltd., Japan). The resultant mixture is melt-kneaded for 10 minutes at 200° C. by means of a Brabender Plastograph, to thereby obtain a coloring composition.

Referential Example F [Production of coloring composition]

(F-1): 100 parts by weight of the colored, modified hydrogenated block copolymer obtained in (C-1) are mixed with 3.0 parts by weight of 1,4-butanediol and 400 parts by weight of a polystyrene (Asahi Chemical Polystyrene 403R, manufactured and sold by Asahi Chemical Industry Co., Ltd., Japan). The resultant mixture is melt-kneaded at 220° C. by means of a 30 mmφ twin-screw extruder, to thereby obtain a coloring composition.

(F-2): 100 parts by weight of the colored, modified hydrogenated block copolymer obtained in (C-2) are mixed with 3.0 parts by weight of 1,4-butanediol and 400 parts by weight of a high density polyethylene (Suntec-HD-J311, manufactured and sold by Asahi Chemical Industry Co., Ltd., Japan). The resultant mixture is melt-kneaded at 200° C. by means of a 30 mmφ twin-screw extruder, to thereby obtain a coloring composition.

(F-3): 100 parts by weight of the colored, modified hydrogenated block copolymer obtained in (C-3) are mixed with 3.0 parts by weight of 1,4-butanediol and 400 parts by weight of a low density polyethylene (Suntec-LD-M6525, manufactured and sold by Asahi Chemical Industry Co., Ltd., Japan). The resultant mixture is melt-kneaded at 200° C. by means of a 30 mmφ twin-screw extruder, to thereby obtain a coloring composition.

(F-4): 100 parts by weight of the colored, modified hydrogenated block copolymer obtained in (C-4) are mixed with 3.0 parts by weight of 1,4-butanediol and 400 parts by weight of polypropylene (Asahi Chemical Polypropylene M7546, manufactured and sold by Asahi Chemical Industry Co., Ltd., Japan). The resultant mixture is melt-kneaded at 220° C. by means of a 30 mmφ twin-screw extruder, to thereby obtain a coloring composition.

(F-5): 100 parts by weight of the colored, modified hydrogenated block copolymer obtained in (C-5) are mixed with 3.0 parts by weight of 1,4-butanediol and 400 parts by weight of an acrylic resin (Delpet 560F, manufactured and sold by Asahi Chemical Industry Co., Ltd., Japan). The resultant mixture is melt-kneaded at 230° C. by means of a 30 mmφ twin-screw extruder, to thereby obtain a coloring composition.

(F-6): 100 parts by weight of the colored, modified hydrogenated block copolymer obtained in (C-1) are mixed with 3.0 parts by weight of 1,4-butanediol and 400 parts by weight of an ABS resin (Stylac-ABS-121B, manufactured and sold by Asahi Chemical Industry Co., Ltd., Japan). The resultant mixture is melt-kneaded at 240° C. by means of a 30 mmφ twin-screw extruder, to thereby obtain a coloring composition.

(F-7): 100 parts by weight of the colored, modified hydrogenated block copolymer obtained in (C-1) are mixed with 3.0 parts by weight of 1,4-butanediol and 400 parts by weight of a polyacetal (Tenac-C4510, manufactured and sold by Asahi Chemical Industry Co., Ltd., Japan). The resultant mixture is melt-kneaded at 200° C. by means of a 30 mmφ twin-screw extruder, to thereby obtain a coloring composition.

(F-8) to (F-10): 100 parts by weight of each of the colored, modified hydrogenated block copolymers obtained in (C-6) to (C-8) are individually mixed with 3.0 parts by weight of 1,4-butanediol and 400 parts by weight of a polystyrene (Asahi Chemical Polystyrene 403R, manufactured and sold by Asahi Chemical Industry Co., Ltd., Japan). Each of the resultant mixtures is individually melt-kneaded at 230° C. by means of a 30 mmφ twin-screw extruder, to thereby obtain coloring compositions (F-8) to (F-10) corresponding, respectively, to (C-6) to (C-8).

(F-11) and (F-12): 100 parts by weight of each of the colored, modified hydrogenated block copolymers obtained in (C-9) and (C-10) are individually mixed with 3.0 parts by weight of 1,4-butanediol and 400 parts by weight of an ABS resin (Stylac-ABS-121B, manufactured and sold by Asahi Chemical Industry Co., Ltd., Japan). Each of the resultant mixtures is individually melt-kneaded at 250° C. by means of a 30 mmφ twin-screw extruder, to thereby obtain coloring compositions (F-11) and (F-12) corresponding, respectively, to (C-9) and Referential Example G [Production of thermoplastic resin composition]

(G-1) to (G-12): 100 parts by weight of each of the coloring compositions obtained in Referential Examples (F-1) to (F-12) are individually, respectively mixed with 1900 parts by weight of each of the diluent polymers employed in (F-1) to (F-12). Each of the resultant mixtures is individually melt-kneaded at, respectively, the same extrusion temperatures as employed in (F-1) to (F-12) by means of a 30 mmφ twin-screw extruder, to thereby obtain thermoplastic resin compositions (G-1) to (G-12) corresponding, respectively, to (F-1) to (F-12).

Referential Example H [Production of shaped thermoplastic resin article]

(H-1) to (H-12): Each of the thermoplastic resin compositions obtained in Referential Examples (G-1) to (G-12) is individually subjected to injection molding at, respectively, the same temperatures employed for extrusion in (F-1) to (F-12), using a film gate mold (gate size: 0.9 mm×2.0 mm) and an injection molding machine with a clamping pressure of 100 tons, thereby obtaining shaped thermoplastic resin articles (H-1) to (H-12) (each being a flat plate-shape article having a size of 90 mm×50 mm×3 mm) corresponding, respectively, to (G-1) to (G-12).

Referential Example I [Production of comparative coloring composition]

(I-1): As described below, a coloring composition is prepared in substantially the same manner as in Example B-1 of Japanese Patent Application Laid-Open Specification No. 2-103254/1990. Specifically, 100 parts by weight of o-cresolnovolak glycidyl ether compound, 50 parts by weight of phenolformaldehyde novolak (curing agent), 1 part by weight of 2-ethyl-4-methyl imidazole (curing accelerator) and 0.1 part by weight of a carbon black are mixed, and the resultant mixture is kneaded at 100° C. to effect curing. The resultant product is pressed for 15 minutes at 170° C. and then, pulverized and classified with respect to particle size, thereby obtaining a coloring composition comprised of cured epoxy resin particles having an average particle diameter of 300 μm.

(I-2): As described below, a coloring composition is prepared in substantially the same manner as in Example 1 of Japanese Patent Application Laid-Open Specification No. 3-28148/1991. Specifically, 100 parts by weight of methyl methacrylate, 150 parts by weight of calcium carbonate, 1 part by weight of TMPT (trimethylolpropane trimethacrylate), 1 part by weight of benzoyl peroxide and 3 parts by weight of a carbon black are mixed, and the resultant mixture is kneaded at 80° C. to effect curing. The resultant product is pulverized and classified with respect to particle size, thereby obtaining a coloring composition having an average particle diameter of 500 μm.

(I-3): As described below, a coloring composition is prepared in substantially the same manner as in Example 1 of Japanese Patent Application Laid-Open Specification No. 3-200841/1991. Specifically, 100 parts by weight of a silane-crosslinkable polypropylene (Linklone XPM-700B manufactured and sold by Mitsubishi Petrochemical Co., Ltd., Japan); 5 parts by weight of a master batch comprised of 100 parts by weight of a propylene-ethylene block copolymer (Mitsubishi Polypropylene-BC3 manufactured and sold by Mitsubishi Petrochemical Co., Ltd., Japan) and 1 part by weight of dibutyltin dilaurate; 0.1 part by weight of magnesium stearate; 0.1 part by weight of zinc stearate; and 0.3 part by weight of a carbon black are mixed, followed by kneading at 210° C., to obtain pellets. The obtained pellets are immersed in hot water at 90° C. for 5 hours to thereby effect a crosslinking reaction. The resultant product is dehydrated, and pulverized and classified with respect to particle size, thereby obtaining a coloring composition having an average particle diameter of 500 µm.

(I-4): 100 parts by weight of a styrene-maleic anhydride copolymer (styrene/maleic anhydride weight ratio: 92/8) are mixed with 1.0 part by weight of a carbon black powder. The resultant mixture is melt-kneaded at 240° C. by means of a 30 mmφ twin-screw extruder, to thereby obtain a colored copolymer. Next, 100 parts by weight of the thus obtained colored copolymer are mixed with 3 parts by weight of 1,4-butanediol and 900 parts by weight of a polystyrene (Asahi Chemical Polystyrene 403R, manufactured and sold by Asahi Chemical Industry Co., Ltd., Japan). The resultant mixture is melt-kneaded at 240° C. by means of a 30 mmφ twin-screw extruder, to thereby obtain a coloring composition.

Referential Example J [Production of thermoplastic resin composition]

100 parts by weight of the coloring composition obtained in (I-4) are mixed with 1900 parts by weight of a polystyrene (Asahi Chemical Polystyrene 403R, manufactured and sold by Asahi Chemical Industry Co., Ltd., Japan) to thereby obtain a thermoplastic resin composition.

EXAMPLES 1 TO 6 AND COMPARATIVE EXAMPLES 1 TO 3

100 parts by weight of the colored, modified hydrogenated block copolymer obtained in (C-1) are mixed with 3.0 parts by weight of each individual crosslinking agent indicated in Table 1 and 5 parts by weight of a polystyrene (Asahi Chemical Polystyrene 666 manufactured and sold by Asahi Chemical Industry Co., Ltd., Japan), and each of the resultant mixtures is individually melt-kneaded at 230° C. for 10 minutes by means of a Brabender Plastograph, thereby obtaining coloring compositions. With respect to each of the obtained coloring compositions, the gel content (%) is determined. Each of the coloring compositions is individually frozen with liquid nitrogen and pulverized. To 100 parts by weight of each of the pulverized coloring compositions are added 10,000 parts by weight of the same polystyrene as mentioned above, and the resultant mixtures are individually subjected to injection molding at 220° C. using the same film gate mold (gate size: 0.9 mm×2.0 mm) and injection molding machine as used in Referential Example H, to thereby obtain colored shaped thermoplastic resin articles (each being a flat plate-shape article having a size of 90 mm×50 mm×3 mm). With respect to each of the obtained colored shaped thermoplastic resin articles, a spot pattern is examined. The results are shown in Table 1. As is apparent from Table 1, each of the coloring compositions obtained in Examples 1 to 6 exhibits a gel content markedly higher than the gel contents of the coloring compositions obtained in Comparative Examples 1 to 3. Also, each of the colored shaped thermoplastic resin articles obtained in Examples 1 to 6 has a distinct spot pattern, differing from the colored shaped thermoplastic resin articles obtained in Comparative Examples 1 to 3 in which the contour of spots is muddled.

TABLE 1

|  | Crosslinking agent | Gel content (%) | Contour of spots | Average particle diameter of spots (µm) |
| --- | --- | --- | --- | --- |
| Example 1 | 1,4-butanediol | 92 | distinct | 350 |
| Example 2 | 1,6-hexanediol | 89 | distinct | 300 |
| Example 3 | hexamethylene diamine | 92 | distinct | 480 |
| Example 4 | hexamethylene diisocyanate | 88 | distinct | 430 |
| Example 5 | ethylene glycol diglycidyl ether | 68 | distinct | 320 |
| Example 6 | diamino polyethylene glycol | 88 | distinct | 400 |
| Comparative Example 1 | butyl alcohol | 0 | muddled | — |
| Comparative Example 2 | hexylamine | 0 | muddled | — |
| Comparative Example 3 | adipic acid | 5 | muddled | — |

EXAMPLES 7 AND 8 AND COMPARATIVE EXAMPLES 4 TO 6

A coloring composition is prepared in substantially the same manner as in Example 1 except that the amount of 1,4-butanediol, i.e., the crosslinking agent is varied. In respective Examples 7 and 8, the crosslinking agent is employed in an amount of 1.0 part by weight and an amount of 6.0 parts by weight, per 100 parts by weight of the colored, modified hydrogenated block copolymer obtained in (C-1). In respective Comparative Examples 4 to 6, the crosslinking agent is employed in an amount of 0.1 part by weight, an amount of 0 part by weight and an amount of 200 parts by weight, per 100 parts by weight of the colored, modified, hydrogenated block copolymer obtained in (C-1). With respect to each of the coloring compositions obtained, the gel content (%) is determined in substantially the same manner as in Example 1. Further, in substantially the same manner as in Example 1, colored shaped thermoplastic resin articles are prepared, and the spot pattern of each of the colored shaped thermoplastic resin articles is examined. The results are shown in Table 2, together with the results of Example 1.

TABLE 2

|  | Amount of 1,4-butanediol (part by weight) | Gel content (%) | Contour of spots | Average particle diameter of spots (µm) |
| --- | --- | --- | --- | --- |
| Example 1 | 3.0 | 92 | distinct | 350 |
| Example 7 | 1.0 | 94 | distinct | 320 |
| Example 8 | 6.0 | 91 | distinct | 380 |
| Comparative Example 4 | 0.1 | 0 | indistinct | — |
| Comparative Example 5 | 0 | 3 | muddled | — |
| Comparative Example 6 | 200 | 10 | muddled | — |

EXAMPLES 9 TO 15

With respect to each of the coloring compositions obtained in (E-1) to (E-7) of Referential Example E, the gel content (%) is determined. Then, 100 parts by weight of each individual coloring composition are, respectively, mixed with 5,000 parts by weight of each of the same individual respective thermoplastic resins as employed in (E-1) to (E-7), to thereby obtain thermoplastic resin compositions corresponding, respectively, to (E-1) to (E-7). Using each of the above-obtained thermoplastic resin compositions individually, shaped thermoplastic resin articles are produced in substantially the same manner as in Example 1. With respect to each of the produced shaped thermoplastic resin articles, a spot pattern is examined. The results are shown in Table 3. As is apparent from Table 3, the gel content of each of the coloring compositions obtained in (E-1) to (E-7) is good, and each of the produced shaped thermoplastic resin articles has a distinct spot pattern.

TABLE 3

|  | Corresponding Referential Examples | Thermoplastic resin | Gel content (%) | Contour of spots | Average particle diameter of spots (μm) |
| --- | --- | --- | --- | --- | --- |
| Example 9 | E-1 | polystyrene | 89 | distinct | 300 |
| Example 10 | E-2 | high density polyethylene | 88 | distinct | 280 |
| Example 11 | E-3 | low density polyethylene | 91 | distinct | 280 |
| Example 12 | E-4 | polypropylene | 88 | distinct | 330 |
| Example 13 | E-5 | acrylic resin | 89 | distinct | 220 |
| Example 14 | E-6 | ABS resin | 90 | distinct | 220 |
| Example 15 | E-7 | polyacetal | 92 | distinct | 360 |

COMPARATIVE EXAMPLES 7 TO 12

As shown in Table 4, 6 types of coloring agents are individually used. Illustratively stated, in Comparative Examples 7 to 10, the respective coloring compositions obtained in Referential Examples (I-1) to (I-4) are, respectively, used, and in Comparative Examples 11 and 12, aluminUm particles (Astroflake No. 40 BLACK manufactured and sold by NIHON BOSHITSU CO., LTD., Japan) and mica particles (Iriodine 163 Shimmer Pearl manufactured and sold by MERK JAPAN, Japan) are, respectively, used. Specifically, 100 parts by weight of each of the above-mentioned 6 types of coloring agents are individually melt-kneaded with 5000 parts by weight of a polystyrene (Asahi Chemical Polystyrene 403 R manufactured and sold by Asahi Chemical Industry Co., Ltd., Japan), to thereby obtain thermoplastic resin compositions. With respect to each of the obtained 6 types of thermoplastic resin compositions, the gel content (gel %) is determined, and examination of a spot pattern is conducted with respect to each of the shaped resin articles produced, respectively, from the above 6 types of thermoplastic resin compositions. Further, a dart drop impact test is conducted with respect to the shaped resin article obtained in Example 9 and the above-obtained shaped resin articles. The results are shown in Table 4. In each of Comparative Examples 7 through 12, the shaped resin article is very poor in dart drop impact strength, as compared to the shaped resin article obtained in Example 9. Further, in Comparative Example 9, the pigment contained in the coloring composition escapes from the coloring composition and diffuses into the matrix resin, so that a distinct contour of spots of a spot pattern in the shaped resin article cannot be obtained.

TABLE 4

|  | Coloring Agent | Gel content (%) | Contour of spots | Dart drop impact strength (kg · cm) |
| --- | --- | --- | --- | --- |
| Example 9 | Coloring composition of the present invention | 89 | distinct | 65 |
| Comparative Example 7 | Referential Example (I-1) | 86 | distinct | 15 |

TABLE 4-continued

|  | Coloring Agent | Gel content (%) | Contour of spots | Dart drop impact strength (kg · cm) |
| --- | --- | --- | --- | --- |
| Comparative Example 8 | Referential Example (I-2) | 81 | distinct | 10 |
| Comparative Example 9 | Referential Example (I-3) | 55 | indistinct | 17 |
| Comparative Example 10 | Referential Example (I-4) | 91 | distinct | 15 |
| Comparative Example 11 | Aluminum particles | — | distinct | 10 |
| Comparative Example 12 | Mica particles | — | distinct | 15 |

EXAMPLES 16 TO 22

With respect to each of the coloring compositions obtained in (F-1) to (F-7) of Referential Example F, the gel content (%) is determined. Then, 100 parts by weight of each individual coloring composition are, respectively, mixed with 500 parts by weight of each of the same individual respective thermoplastic resins as employed in (F-1) to (F-7), to thereby obtain thermoplastic resin compositions. Using each of the above-obtained thermoplastic resin compositions individually, shaped thermoplastic resin articles are produced in substantially the same manner as in Example 1. The results are shown in Table 5. The gel content of each of the coloring compositions obtained in (F-1) to (F-7) is good, and each of the produced shaped thermoplastic resin articles has a distinct spot pattern.

TABLE 5

| | Corresponding Referential Examples | Thermoplastic resin | Gel Content (%) | contour of spots | Average particle diameter of spots (μm) |
|---|---|---|---|---|---|
| Example 16 | F-1 | polystyrene | 39.8 | distinct | 310 |
| Example 17 | F-2 | high density polyethylene | 19.8 | distinct | 300 |
| Example 18 | F-3 | low density polyethylene | 18.6 | distinct | 270 |
| Example 19 | F-4 | polypropylene | 20.3 | distinct | 300 |
| Example 20 | F-5 | acrylic resin | 21.5 | distinct | 230 |
| Example 21 | F-6 | ABS resin | 42.9 | distinct | 250 |
| Example 22 | F-7 | polyacetal | 19.6 | distinct | 300 |

EXAMPLES 23 TO 29

With respect to each of the thermoplastic resin compositions obtained in (G-1) to (G-7) of Referential Example G, the gel content (%) is determined. Further, with respect to each of the shaped thermoplastic resin articles obtained in (H-1) to (H-7) of Referential Example H, determination of the gel content, examination of the spot pattern, and measurement of the average particle diameter of spots are conducted. The results are shown in Table 6. As is apparent from Table 6, the gel content of each of the thermoplastic resin compositions and that of each of the shaped thermoplastic resin articles are good, and each of the shaped thermoplastic resin articles has a distinct spot pattern.

num particles [Astroflake No. 70 BLACK (particle diameter: 1 mm×1 mm) manufactured and sold by NIHON BOSHITSU Co., Ltd., Japan] and 5,000 parts by weight of the same polystyrene as mentioned above is used. In Comparative Example 14, a thermoplastic resin composition prepared by melt-kneading a mixture of 100 parts by weight of mica particles [Phlogopite Mica S20 (particle diameter: 700 μm) manufactured and sold by Repco Ltd., U.S.A.] and 5,000 parts by weight of the same polystyrene as mentioned above is used. Specifically, each of the above-mentioned thermoplastic resin compositions is individually subjected to molding in substantially the same manner as in Example 1 except that a pin gate mold having a gate diameter of 800 μm is used, to thereby obtain respective shaped thermoplastic

TABLE 6

| | Corresponding Referential Examples | Gel content of thermoplastic resin composition (%) | Gel content of shaped thermoplastic resin composition (%) | Contour of spots | Average particle diameter of spots (μm) |
|---|---|---|---|---|---|
| Example 23 | G-1 H-1 | 23.8 | 21.7 | distinct | 310 |
| Example 24 | G-2 H-2 | 1.05 | 0.98 | distinct | 330 |
| Example 25 | G-3 H-3 | 1.21 | 1.17 | distinct | 210 |
| Example 26 | G-4 H-4 | 1.03 | 0.98 | distinct | 320 |
| Example 27 | G-5 H-5 | 2.5 | 2.2 | distinct | 300 |
| Example 28 | G-6 H-6 | 25.4 | 24.7 | distinct | 310 |
| Example 29 | G-7 H-7 | 0.96 | 0.92 | distinct | 240 |

EXAMPLES 30 TO 32 AND COMPARATIVE EXAMPLES 13 AND 14

The coloring composition obtained in Example 4 is frozen with liquid nitrogen and pulverized, to obtain a pulverized product. A thermoplastic resin composition is prepared by adding 5,000 parts by weight of a polystyrene (Asahi Chemical Polystyrene 403 R manufactured and sold by Asahi Chemical Industry Co., Ltd., Japan) to 100 parts by weight of the obtained pulverized product. This thermoplastic composition is used in Example 30. In Examples 31 and 32, the thermoplastic resin composition obtained in Example 16 and the thermoplastic resin composition obtained in Example 23 are, respectively, used. In Comparative Example 13, a thermoplastic resin composition prepared by melt-kneading a mixture of 100 parts by weight of alumiresin articles, each having a flat plate-like configuration. As shown in Table 7, in Examples 30 to 32 in which coloring compositions of the present invention are used, the maximum particle diameter of spots of the spot pattern on the obtained shaped thermoplastic resin article is larger than the gate diameter, and the contour of the spots of the spot pattern is distinct. By contrast, in Comparative Example 13, deformation of aluminum particles occurs, and in Comparative Example 14, mica particles suffer breakage, so that the average particle diameter of spots is decreased. In Comparative Examples 13 and 14, no spot has a diameter larger than the gate diameter.

TABLE 7

| | Coloring agent | Average particle diameter of spots (μm) | Maximum particle diameter of spots (μm) | Note |
|---|---|---|---|---|
| Example 30 | Coloring composition of the present invention | 320 | 1570 | Contour of spots is distinct |
| Example 31 | Coloring composition of the present invention | 290 | 2010 | Contour of spots is distinct |
| Example 32 | Coloring composition of the present invention | 300 | 1760 | Contour of spots is distinct |
| Comparative Example 13 | Aluminum particles | 370 | 520 | Deformation of aluminum particles is observed |
| Comparative Example 14 | Mica particles | 350 | 610 | Breakage of particles is observed |

EXAMPLES 33 AND 35 AND COMPARATIVE EXAMPLES 15 TO 17

In Examples 33 to 35, the shaped thermoplastic resin articles respectively obtained in Referential Examples (H-8), (H-9) and (H-11) are individually subjected to determination of the gel content (%), examination of the spot pattern, and the dart drop impact test, in substantially the same manners as in Example 9 and Comparative Examples 7 to 12. In Comparative Examples 15 and 16, the shaped thermoplastic resin articles respectively obtained in Referential Examples (H-10) and (H-12) are individually subjected to determination of the gel content (%), examination of the spot pattern, and the dart drop impact test, in substantially the same manner as in Example 9 and Comparative Examples 7 to 12. In Comparative Example 17, a shaped thermoplastic resin article which is prepared by subjecting the thermoplastic resin composition obtained in Referential Example (J) to molding in substantially the same manner as in Example 1, is subjected to determination of the gel content (%), examination of the spot pattern, and the dart drop impact test, in substantially the same manner as in Example 9 and Comparative Examples 7 to 12. The results are shown is Table 8, together with the results of Example 9. The shaped thermoplastic resin articles obtained in Comparative Examples 15 and 17 are very poor in dart drop impact strength, as compared to the shaped thermoplastic resin articles obtained in Examples 9, 33 and 34. The shaped thermoplastic resin article obtained in Comparative Example 16 is very poor in dart drop impact strength, as compared to the shaped thermoplastic resin article obtained in Example 35.

TABLE 8

| | Coloring Composition | Gel content (%) | Contour of spots | Dart drop impact strength (kg · cm) |
|---|---|---|---|---|
| Example 9 | Coloring composition of the present invention | 21.5 | distinct | 65 |
| Example 33 | Coloring composition of the present invention | 22.2 | distinct | 70 |
| Example 34 | Coloring composition of the present invention | 20.8 | distinct | 60 |
| Comparative Example 15 | Referential Example (H-10) | 21.2 | distinct | 20 |
| Comparative Example 16 | Referential Example (H-12) | 21.4 | distinct | 15 |
| Example 35 | Coloring composition of the present invention | 22.3 | distinct | 45 |
| Comparative Example 17 | Referential Example (I-4) | 22.3 | distinct | 15 |

The coloring composition of the present invention can be used as a decorating agent for patterning a resin with a stone grain pattern or the like, which is excellent in morphological stability and thermal stability in injection molding. Further, in a thermoplastic resin composition containing the coloring composition of the present invention, the colorant of the coloring composition does not diffuse into other components, such as the matrix resin, which are in contact with the coloring composition. The present invention has for the first time made it possible to provide a decorating agent for a thermoplastic resin, which is comprised mainly of a thermoplastic elastomer.

The coloring composition of the present invention is excellent in tensile elongation and melt adhesion properties with a thermoplastic resin. Therefore, a colored shaped thermoplastic resin article containing the coloring composition of the present invention is markedly improved in important mechanical properties, such as tensile properties and impact strength, as compared to shaped resin articles produced by conventional techniques.

In addition, the coloring composition of the present invention is excellent in metamorphic susceptivity and recoverability, so that when a thermoplastic resin composition containing the coloring composition of the present invention is subjected to molding, breakage of the decorating agent particles does not occur, so that the decorating agent particles in the obtained shaped resin article exhibit their original size. Further, by using a thermoplastic resin composition containing the coloring composition of the present invention, it becomes possible to produce a shaped resin article which has conventionally been impossible to produce, i.e., a shaped resin article which has a decorative pattern formed of dispersed decorating agent particles in which the size of the coloring agent particles is larger than the diameter of the gate of the mold employed.

We claim:

1. A coloring composition comprising:
   (1) 100 parts by weight of a crosslinked block copolymer which is produced by crosslinking a graft-modified block copolymer comprising molecular chains of a base block copolymer comprising at least one polymer block (A) comprised mainly of vinyl aromatic monomer units, and at least one polymer block (B) comprised mainly of conjugated diene monomer units, wherein each of said molecular chains of the base block copolymer has, grafted thereon, at least one functional group selected from the group consisting a hydroxyl group, an epoxy group, an amino group, a carboxylic acid group and a carboxylic acid anhydride group,
   said molecular chains of the base block copolymer being crosslinked through a crosslinkage containing at least one linkage selected from the group consisting of an imide linkage, an amide linkage, an ester linkage and a urethane linkage; and
   (2) from 0.001 to 20.0 parts by weight of at least one colorant selected from the group consisting of an organic pigment, an inorganic pigment and an organic dye,
   said coloring composition having a gel content of 60% by weight or more.

2. The coloring composition according to claim 1, wherein said polymer block (B) is comprised mainly of hydrogenated, conjugated diene monomer units.

3. The coloring composition according to claim 1 or 2, which further comprises a diluent and has a gel content of from 10 to 80% by weight.

4. The coloring composition according to claim 1 or 2, which is prepared using an extruder.

5. A colored thermoplastic resin composition comprising a thermoplastic resin and a coloring composition according to claim 1, wherein said colored thermoplastic resin composition has a gel content of 0.1 to 50% by weight.

6. The colored thermoplastic resin composition according to claim 5, which is prepared using an extruder.

7. A colored shaped thermoplastic resin article produced from the colored thermoplastic resin composition according to claim 5 or 6, wherein said coloring composition is dispersed in said thermoplastic resin as a plurality of particles having an average particle diameter of from 10 to 30,000 μm.

8. The coloring composition according to claim 3, wherein said diluent is selected from the group consisting of resin, thermoplastic elastomer, plasticizer, fats, oils and combinations thereof.

9. The coloring composition according to claim 8, wherein said diluent is selected from the group consisting of styrene, polyethylene, polypropylene, modified polyphenylene ether, polyacetal, vinyl chloride polymer, vinyl chloride copolymer, polycarbonate, polyamide, polyester, polyacrylate, polyarylate, polysulfone, polyethersulfone, polyetherimide, and liquid crystalline resin.

10. The coloring composition according to claim 8, wherein said diluent is selected from the group consisting of styrene thermoplastic elastomer, olefin thermoplastic elastomer, ester thermoplastic elastomer, amide thermoplastic elastomer, urethane thermoplastic elastomer, PVC thermoplastic elastomer, syndiotactic 1,2-polybutadiene, trans-1,4-polyisoprene and ionomer.

11. The coloring composition according to claim 8, wherein said diluent is styrene resin or styrene thermoplastic elastomer.

12. The coloring composition according to claim 1, wherein said vinyl aromatic monomer units of polymer block (A) are selected from the group consisting of styrene, α-methylstyrene, p-methylstyrene, vinyltoluene, p-tertiary butylstyrene, and 1,1-diphenylethylene.

13. The coloring composition according to claim 1, wherein said polymer block (A) is a copolymer block comprised of vinyl aromatic monomer units in an amount of at least 50% by weight, and either unhydrogenated, conjugated diene monomer units or hydrogenated, conjugated diene monomer units.

14. The colored thermoplastic resin composition according to claim 5, wherein said thermoplastic resin is selected from the group consisting of styrene resin, polyethylene, polypropylene, modified polyphenylene ether, polyacetal, vinyl chloride polymer, vinyl chloride copolymer, polycarbonate, polyamide, polyester, polyacrylate, polyarylate, polysulfone, polyethersulfone, polyetherimide, and liquid crystalline resin.

15. The colored thermoplastic resin composition according to claim 14, wherein said thermoplastic resin is a styrene resin selected from the group consisting of polystyrene, acrylonitrile-styrene resin, and acrylonitrile-butadiene-styrene resin.

16. The colored thermoplastic resin composition according to claim 5, wherein said polymer block (B) is comprised mainly of hydrogenated, conjugated diene monomer units.

17. The coloring composition according to claim 1, wherein said gel content is at least 80% by weight.

18. The coloring composition according to claim 3, wherein said gel content is 15 to 50% by weight.

19. The coloring composition according to claim 1 or 2, wherein said component (1) is a crosslinked product of a graft-modified block copolymer which comprises molecular chains of a base block copolymer comprising at least one polymer block (A) comprised mainly of vinyl aromatic monomer units, and at least one polymer block (B) comprised mainly of conjugated diene monomer units,
   each of said molecular chains of the base block copolymer having, grafted thereon, at least one functional group selected from the group consisting of a hydroxyl group, an epoxy group, an amino group, a carboxylic acid group and a carboxylic acid anhydride group.

20. The coloring composition according to claim 19, wherein said at least one functional group is selected from the group consisting of a carboxylic acid group and a carboxylic acid anhydride group.

21. The coloring composition according to claim 1, wherein said at least one functional group is selected from the group consisting of a carboxylic acid group and a carboxylic acid anhydride group.

22. The coloring composition according to claim 2, wherein said at least one functional group is selected from the group consisting of a carboxylic acid group and a carboxylic acid anhydride group.

* * * * *

UNITED STATES PATENT AND TRADEMARK OFFICE
CERTIFICATE OF CORRECTION

PATENT NO. : 5,696,200
DATED : December 9, 1997
INVENTOR(S) : Mutsumi MAEDA et al.

It is certified that error appears in the above-identified patent and that said Letters Patent is hereby corrected as shown below:

On the Title Page:

Change Item [30] Foreign Application Priority Data, to read as follows:

Change "Oct. 3, 1993" to --Oct. 4, 1993--

Signed and Sealed this

Twenty-second Day of September, 1998

Attest:

BRUCE LEHMAN

*Attesting Officer*      *Commissioner of Patents and Trademarks*